US008844950B2

(12) United States Patent
Greene et al.

(10) Patent No.: US 8,844,950 B2
(45) Date of Patent: Sep. 30, 2014

(54) STORAGE TOTE WITH LEGS

(75) Inventors: Michael Greene, Mendocino, CA (US);
Charles E. Wagner, Winfield, KS (US);
Scott M. Herndon, Arkansas City, KS (US); David L. Barthuly, Winfield, KS (US)

(73) Assignee: Western Industries, Inc., Winfield, KS (US)

(*) Notice: Subject to any disclaimer, the term of this patent is extended or adjusted under 35 U.S.C. 154(b) by 254 days.

(21) Appl. No.: 13/276,777

(22) Filed: Oct. 19, 2011

(65) Prior Publication Data

US 2012/0223494 A1    Sep. 6, 2012

Related U.S. Application Data

(60) Provisional application No. 61/449,376, filed on Mar. 4, 2011.

(51) Int. Cl.
| | |
|---|---|
| *B62B 1/12* | (2006.01) |
| *B25H 1/12* | (2006.01) |
| *B25H 3/02* | (2006.01) |
| *B25H 1/04* | (2006.01) |
| *B62B 1/20* | (2006.01) |

(52) U.S. Cl.
CPC .. *B25H 1/04* (2013.01); *B25H 1/12* (2013.01); *B25H 3/02* (2013.01); *B62B 2206/006* (2013.01); *B62B 1/20* (2013.01)
USPC .............................. 280/47.26; 280/30; 280/35

(58) Field of Classification Search
USPC .......... 280/28.12, 29, 30, 35, 37, 47.26, 638, 280/639, 645; 108/11, 14; 220/628, 629, 220/631, 636; 206/216, 218
See application file for complete search history.

(56) References Cited

U.S. PATENT DOCUMENTS

| | | | | | |
|---|---|---|---|---|---|
| 971,060 | A | * | 9/1910 | Lynch | 206/45.24 |
| 1,109,418 | A | * | 9/1914 | Hines | 222/185.1 |
| 1,901,732 | A | * | 3/1933 | Clark | 108/125 |
| 1,969,723 | A | * | 8/1934 | Bontemps | 108/131 |
| 2,603,500 | A | * | 7/1952 | Messier | 280/30 |
| 2,683,639 | A | * | 7/1954 | Brenny | 108/132 |
| 2,718,405 | A | * | 9/1955 | Casey | 280/35 |
| 2,721,407 | A | * | 10/1955 | Sutherland | 108/121 |
| 2,871,920 | A | * | 2/1959 | Nichols, Jr. et al. | 297/124 |
| 2,956,849 | A | * | 10/1960 | Dow | 108/14 |
| 3,009,750 | A | * | 11/1961 | Hendricks | 108/11 |
| 3,608,600 | A | | 9/1971 | Lehrman | |
| 3,777,675 | A | * | 12/1973 | Hanusiak | 108/132 |
| 3,873,114 | A | | 3/1975 | Brown | |
| 3,923,356 | A | * | 12/1975 | Washburne | 312/241 |

(Continued)

*Primary Examiner* — Anne Marie Boehler
*Assistant Examiner* — Maurice Williams
(74) *Attorney, Agent, or Firm* — Boyle Fredrickson, S.C.

(57) ABSTRACT

A storage tote includes a base and a selectively movable lid. A support assembly is secured to the base and movable between a folded position and a deployed position. In the folded position, the support assembly extends generally parallel to the surface upon which it is supported. In the deployed position, the support assembly extends generally downwardly to support the base at a height substantially above the support surface. The support assembly may include a pair of opposing legs. The support assembly may additionally include a one or more pairs of wheels for selective movement of the storage tote from one location to another. A leg retention assembly may be provided for securing the legs in the folded position to prevent accidental or otherwise unwanted movement of the legs from the folded position.

19 Claims, 10 Drawing Sheets

(56) References Cited

U.S. PATENT DOCUMENTS

| | | | |
|---|---|---|---|
| 4,049,091 A * | 9/1977 | Chubb | 190/18 R |
| 4,566,661 A * | 1/1986 | Mestler | 248/171 |
| 4,934,549 A | 6/1990 | Allen | |
| 5,082,301 A * | 1/1992 | Schumacher et al. | 280/38 |
| 5,240,264 A | 8/1993 | Williams | |
| 5,249,438 A | 10/1993 | Rhaney et al. | |
| 5,285,656 A | 2/1994 | Peters | |
| 5,480,170 A | 1/1996 | Kaiser, III | |
| 5,551,558 A | 9/1996 | Bureau | |
| 5,642,895 A * | 7/1997 | Wunder | 280/30 |
| 5,730,282 A | 3/1998 | Bureau | |
| 5,755,453 A * | 5/1998 | Bell | 280/477 |
| 6,068,355 A * | 5/2000 | Thorp | 312/241 |
| 6,213,265 B1 * | 4/2001 | Wang | 190/11 |
| 6,257,229 B1 | 7/2001 | Stewart et al. | |
| 6,328,179 B1 | 12/2001 | Conrado et al. | |
| 6,739,150 B2 | 5/2004 | Mompo Garcia | |
| 6,971,321 B1 * | 12/2005 | Strong et al. | 108/133 |
| 7,156,273 B2 | 1/2007 | Morris | |
| 7,249,771 B1 | 7/2007 | Brennan et al. | |
| 7,341,164 B2 | 3/2008 | Barquist et al. | |
| 7,360,784 B2 | 4/2008 | Stewart et al. | |
| 7,451,709 B2 | 11/2008 | Swartfager et al. | |
| 7,604,290 B1 | 10/2009 | Giordano | |
| 7,607,630 B2 | 10/2009 | Jung et al. | |
| 7,658,388 B1 * | 2/2010 | Rodriguez et al. | 280/30 |
| 7,708,160 B2 | 5/2010 | Booth et al. | |
| D622,518 S | 8/2010 | Jordan | |
| 7,766,179 B2 | 8/2010 | George et al. | |
| 7,845,653 B2 | 12/2010 | Katz | |
| 7,896,451 B2 | 3/2011 | Walsh | |
| 7,954,183 B2 | 6/2011 | Cawthon | |
| 8,033,417 B1 * | 10/2011 | Fallacaro | 220/629 |
| 2003/0221595 A1 * | 12/2003 | Reinsch et al. | 108/91 |
| 2004/0182381 A1 * | 9/2004 | Yeh | 126/25 R |
| 2006/0065665 A1 * | 3/2006 | Swartfager et al. | 220/592.2 |
| 2009/0146387 A1 * | 6/2009 | Klein | 280/30 |
| 2009/0266833 A1 | 10/2009 | Savage et al. | |
| 2011/0169235 A1 * | 7/2011 | Moster | 280/30 |
| 2011/0315695 A1 | 12/2011 | Fuqua | |

* cited by examiner

STORAGE TOTE WITH LEGS

CROSS-REFERENCE TO RELATED APPLICATIONS

The present application claims the benefit of priority to U.S. Provisional Patent Application Ser. No. 61/449,376 filed on Mar. 4, 2011 and entitled Storage Tote with Legs, the entirety of which is hereby expressly incorporated by reference thereto.

FIELD OF THE INVENTION

The present invention relates to storage totes and, more particularly, to storage totes having a selectively movable support assembly configured to support the storage tote in a folded orientation at or near a support surface and in a deployed position in which the storage tote is supported in an elevated position relative to the support surface.

BACKGROUND OF THE INVENTION

Storage totes are well known in the art. Typical storage totes include a base having a number of walls that cooperate to define a cavity or interior and an opening through which items to be stored within the cavity may be introduced. These storage totes oftentimes include a lid that may be placed over the opening to prevent access to or protect the contents of the storage container. The lid may be provided either completely separate from the base and secured to the base by snapping, or otherwise mechanically engaging the lid with a portion of the base surrounding the opening. In other instances, the lid may be hingedly coupled to the base such that the lid remains attached to the base and is movable between a closed position in which the lid covers the opening and an open position in which the lid is rotated about the hinges of the storage container to a position being slightly past vertical such that the lid may come to rest once it reaches the open position.

One or more latch elements may be provided to selectively lock the lid to the base to prevent removal of the lid from the base. A locking device such as a padlock or the like may be provided in some cases for further securing the contents of the storage container by preventing the latch elements from being opened while the locking device is in place. These storage totes are commonly constructed of a plastic material or similarly durable material formed through a molding process such as blow molding or the like.

These storage totes suffer from a number of disadvantages. Oftentimes it is desirable to elevate the storage tote above a support surface; however, known storage totes do not have means for elevating the tote. Accordingly, such totes have to be supported on additional structures such as tables and the like in order to support the totes at a desirable height. Such additional structures may not be configured to hold the weight of the tote and its contents, or may be otherwise generally unsteady. Some known storage totes have provided means for elevating the storage tote; however such means are generally cumbersome to utilize and/or construct. Further, such means are generally susceptible to wear and tear. In addition, such means may add considerably to the overall weight and size of the of the storage tote.

Further, construction of such totes may be relatively time consuming and require the use of a number of secondary tooling or materials. As such, such processes are generally also relatively costly.

Accordingly, a storage tote that overcomes one or more of the foregoing disadvantages of the known storage totes is desired.

SUMMARY OF THE INVENTION

According to one aspect of the invention, a storage tote includes a base. The base has a front wall, a back wall opposite the front wall, a first end wall, a second end wall opposite the first end wall and generally transverse to the front wall and back wall, and a bottom wall opposite an open top. The front, back, first and second end, and bottom walls cooperate to define an interior or cavity in which any number of items may be stored within the storage tote.

A lid may be hingedly coupled to the base and may be selectively movable between a closed position in which the lid overlies the open top and an open position in which the lid is rotated to a point past vertical with respect to the back wall of the base. This enables a user to access the contents or introduce items to the interior of the base. A latch assembly may be provided for securing the lid to the base when the lid is in the closed position. In at least one embodiment, the lid may be selectively removable from the base entirely. In at least one other embodiment, the lid may be configured to detach from the base upon the exertion of a predetermined amount of force to the lid to prevent damage from occurring to the base and/or the lid.

A support assembly may be secured to the base. The support assembly may be selectively rotatable with respect to the base between a folded position and a deployed position. In the folded position the support assembly is generally parallel with an axis defined by a length of the front and back walls so that the storage tote is supported at or near a support surface. In the deployed position the support assembly is substantially longitudinally arranged so as to support the storage tote at a distance substantially above the support surface.

The support assembly may include a first pair of legs coupled to the base adjacent to the first end wall and a second pair of legs coupled to the base adjacent to the second end wall. The legs may be coupled to the base by a pin about which each of the legs is configured to rotate. Alternatively, the legs of each of the leg pairs may be coupled to the base and one another by way of an axle extending across a width of the base. Each of the legs of the first pair of legs and the second pair of legs is selectively rotatable between a folded position and a deployed position. The legs of the first pair of legs may be coupled to one another by a first connector. Likewise, the legs of the second pair of legs may be coupled to one another by a second connector. In this manner, the legs of the first pair and second pair of legs are simultaneously rotatable to ensure relatively easy deployment of the support assembly. At least one of the first pair of legs and the second pair of legs may include one or more wheels attached to each of the legs thereof. In this manner, the storage tote is selectively movable about the support surface by way of the wheels. Also, at least one of the first and second pairs of legs may include a projection or flange element configured to engage the support surface and support the base while the support assembly is in the folded position.

Numerous other aspects, features, and advantages of the invention will be made apparent from the following detailed description.

DETAILED DESCRIPTION OF THE INVENTION

Turning now to the drawings, and initially FIGS. 1-7, a storage tote 20 of the present invention includes a base 22, a lid 24 movably coupled to the base and a support assembly 26 selectively movably coupled to the base. The lid 24 is shown in a closed orientation and may be hingedly coupled to the base 22 or may otherwise be configured for removal therefrom. For instance, the lid 24 may simply be secured to the base 22 and then lifted and entirely removed from the base 22. The lid 24 may be rotatably moved relative the base 22 or any other such alternative manner of moving relative to the base 22. In addition, the lid 24 may be removably secured to the base 22 such that the lid 24 is configured to be separated from the base 22 upon the application of a predetermined external force to prevent damage to lid 24 and/or the base 22. For instance, the lid 24 may be configured to be separated from the base 22 upon experiencing a predetermined amount of force in the form of wind when the lid 24 is in an open orientation.

The base 22 may be constructed from a plastic or similarly durable and relatively lightweight material to facilitate relatively easy transport of the base 22 from one place to another. For instance, the base 22 may be formed by blow molding or some similar such known method. The lid 24 may be constructed from the same, similar, or different material as the base 22 and understandably may be constructed via the same, similar, or different process. Moreover, the base 22 and the lid 24 may have a single wall or dual wall construction as is generally understood in the art.

Figure 14:
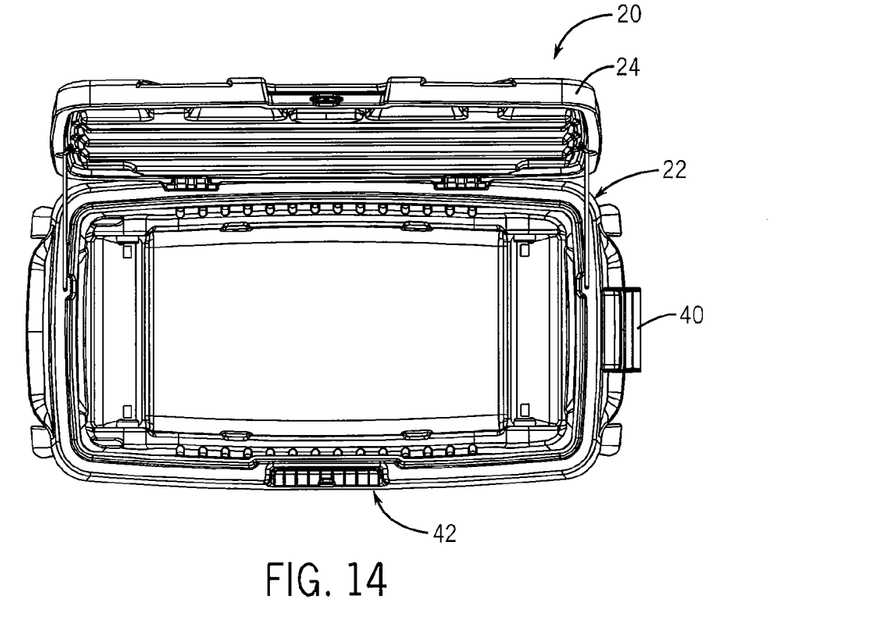
FIG. 14 is a top plan view of the storage tote of FIG. 8.

The base 22 includes a front wall 28, a back wall 30 (see FIG. 3) opposite front wall 28, a first end wall 32 (see FIG. 5), a second end wall 34 (see FIG. 4) opposite the first end wall 32, and a bottom wall 36 (see FIG. 7) opposite an open top (see FIG. 14) that may be selectively covered by the lid 24. The first end wall 32 and second end wall 34 may include one or more recesses 38 formed in an underside of a flanged surface thereof. Recesses 38 are selectively engageable by a user of the storage tote 20 to carry the storage tote 20 from one location to another.

In addition, one or more handles 40 may be coupled to the storage tote 20. The one or more handles 40 of the base 22 may be disposed about any of the walls of the base. In a preferred but exemplary embodiment of the base 22, the base 22 includes a single handle disposed on one of the first end wall 32 and the second end wall 34. For instance, as shown, second end wall 34 includes a single handle 40 that is selectively graspable to move the storage tote 20 as will be discussed in further detail herein. Understandably, first end wall 32 may likewise include a handle. Of course, the first end wall 32 may include the handle 40 while the second end wall may be entirely devoid of a handle 40. The handle 40 may be constructed during a separate process and secured to the base 22 during or after formation of the base 22. For example, the handle may be constructed from a plastic or other such material in keeping with the spirit of the present invention. In a preferred but exemplary embodiment, the handle 40 may be formed via a conventional molding process generally known in the art and coupled to the base 22 during or after the formation thereof. The handle 40 may be formed of a similar, dissimilar, or the same material as the base 22, as is generally understood.

Figure 4:
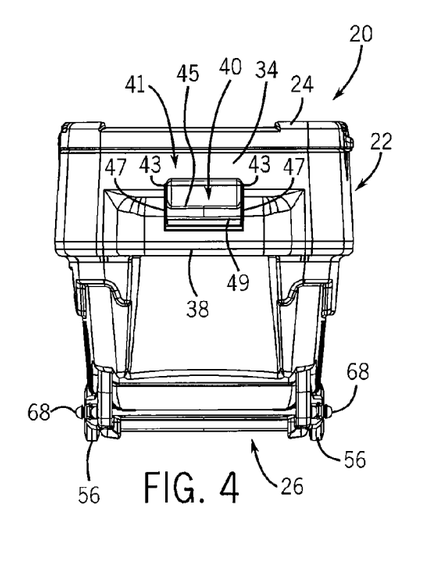
FIG. 4 is an end elevation view of the storage tote of FIG. 1.
Figure 5:
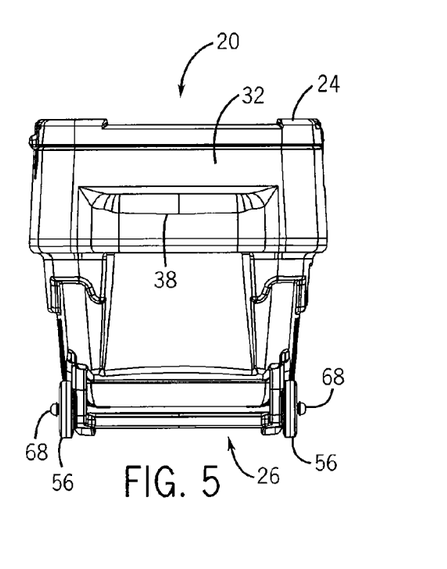
FIG. 5 is an opposite end elevation view of the storage tote of FIG. 4.

Now referring to FIG. 4 in particular, the handle 40 may be secured to the base 22 by way of an attachment assembly 41. The attachment assembly 41 includes at least one pivot 43 having a pair of ends insertable in a recess, aperture, or other formation (not shown) in the base 22 for securing the pivot 43 in place. The handle 40 may include a generally U-shaped construction wherein a body 45 of the handle 40 includes a pair of arms 47 interconnected by a central portion 49 configured to be grasped by the user of the storage tote 20. The pivot 43 may be disposed generally transversely to the arms 47 and parallel to the central arm 49. Alternatively, the pivot 43 may be constructed as portions of the proximate ends of the arms 47 or have some other such construction. In any case, the pivot 43 is configured to enable rotation of the body 45 about a generally horizontal axis defined by the pivot 43 to enable the user to lift the base 22 by the handle 40.

Figure 17:
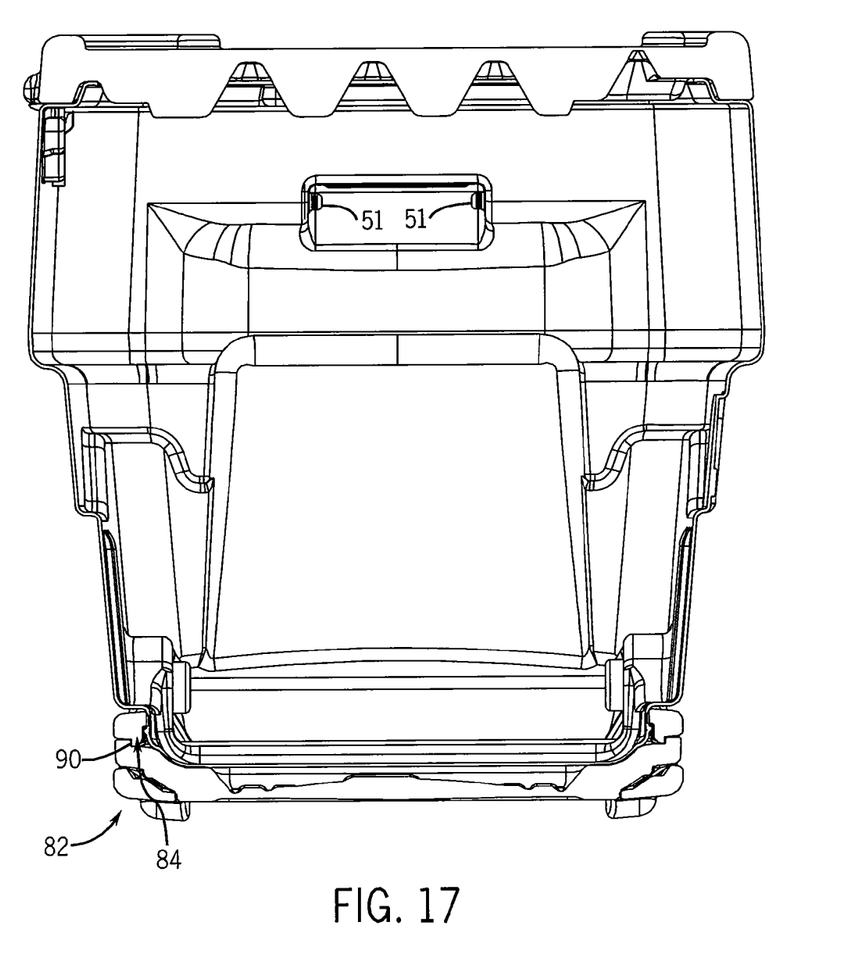
FIG. 17 is an end elevation cross-sectional view of a portion of the storage tote showing the support assembly retention assembly and a portion of a handle assembly.

With momentary reference to FIG. 17, further details of the handle 40 according to a preferred but exemplary embodiment of the present invention are illustrated. In particular, handle ends 51 are shown inserted through an aperture formed in the respective end wall 32, 34. The handle ends 51 may have a generally circular cross-sectional shape and are sized to prevent the handle ends 51 from being pulled out through the apertures to thereby secure the handle 40 to the base 22. Moreover, the handle ends 51 are configured to be selectively rotatable to serve as the pivot 43 for the handle 40 to enable selective rotation of the handle about a horizontal axis defined between the respective handle ends 51. Understandably, alternative constructions of the pivot 43 are envisioned and may comprise any number of suitable alternatives.

Referring back to FIGS. 1-2, the base 22 may include a latch assembly 42 coupled to the front wall 28. The latch assembly 42 is configured to engage a portion of the lid 24 when the lid is positioned in its closed position to thereby secure the lid 24 to the base 22. Understandably, the latch assembly 42 may be coupled to any of the walls 28, 30, 32, 34 in keeping with the present invention. Moreover, one or more additional latch assemblies 42 may be provided on any one of the walls 28, 30, 32, 34. In addition, the latch assembly 42 may include means for receiving a secondary locking mechanism such as a padlock or other such locking means. In this manner, the latch assembly 42 may be configured to further secure the contents received within the base 22.

Figure 1:
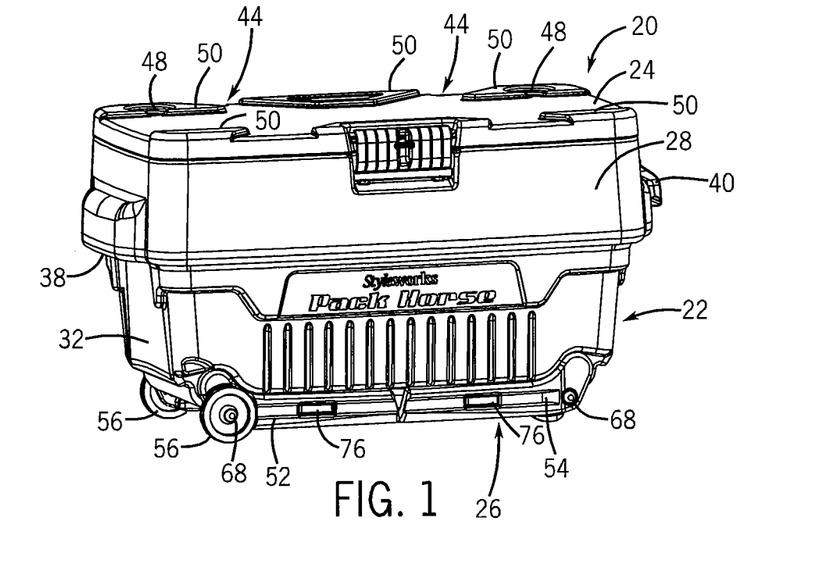
FIG. 1 is an isometric view of a storage tote according to the present invention in which legs of a support assembly are arranged in a folded orientation and a lid of the storage tote is in a closed orientation.
Figure 2:
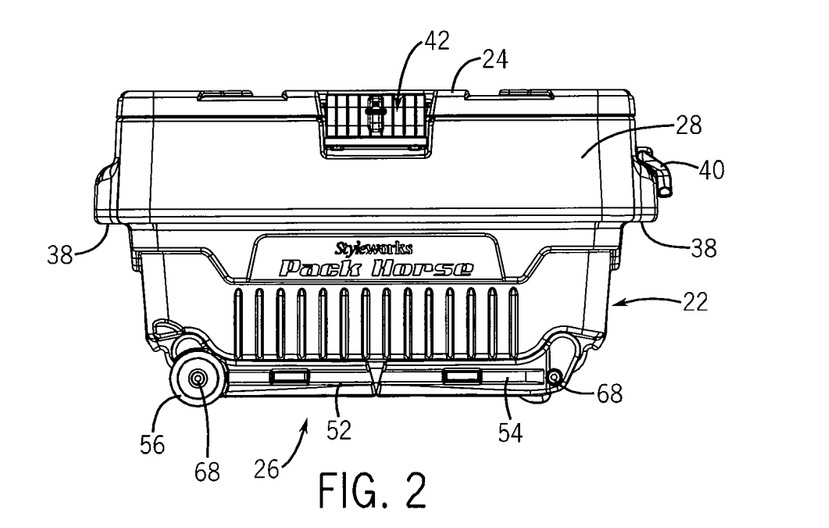
FIG. 2 is a front elevation view of the storage tote of FIG. 1.
Figure 3:
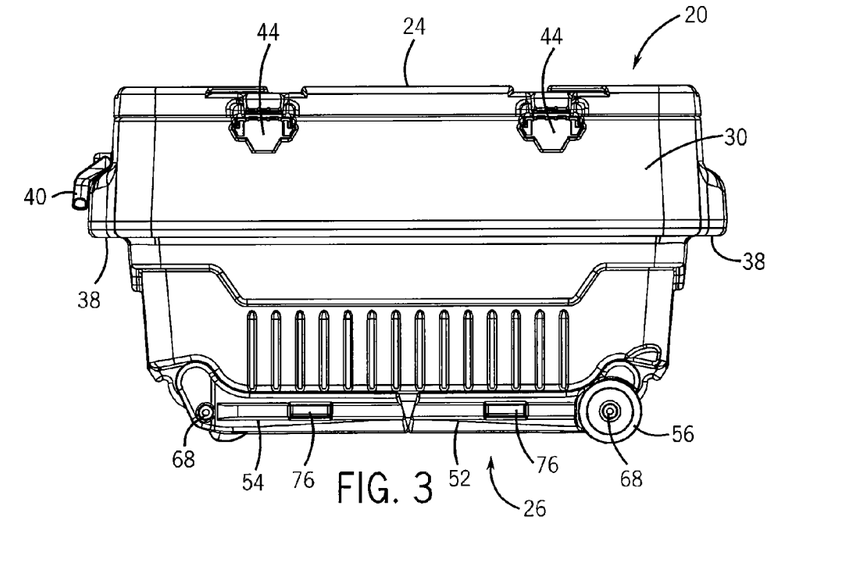
FIG. 3 is an enlarged rear elevation view of the storage tote of FIG. 1.

Referring now to FIG. 3, the base 22 may additionally include a hinge assembly 44 coupled to back wall 30 and secured to the lid 24 to enable selective rotation of the lid 24 with respect to the base between a closed position in which the lid overlies the open top of the base 22 and an open position in which the lid 24 is positioned at a point past vertical with respect to the back wall 30. Referring momentarily to FIGS. 8-11, one or more flexible hinge members 46 may be provided to limit the rotation of lid 24 with respect to base 22.

In addition the latch assembly 42 and hinge assembly 44 may comprise constructions similar to that disclosed in currently pending U.S. patent application Ser. No. 13/021,273 filed on Feb. 4, 2011 and entitled "Storage Container", the disclosure of which is hereby incorporated by explicit reference thereto.

Figure 6:
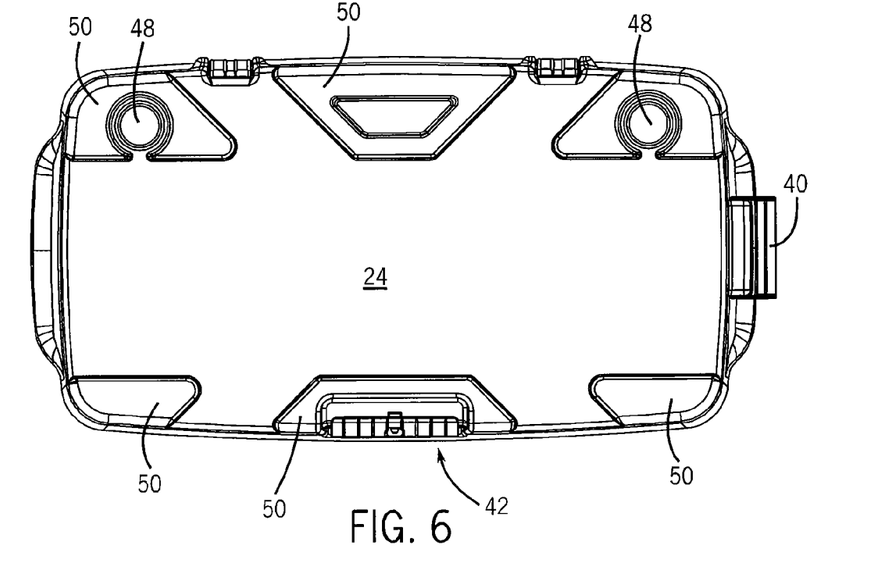
FIG. 6 is an enlarged top plan view of the storage tote of FIG. 1.
Figure 7:
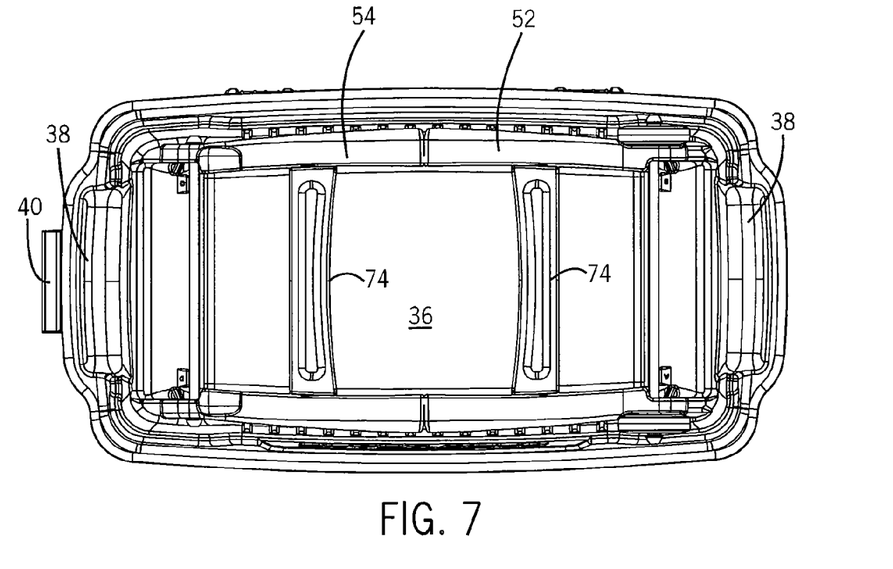
FIG. 7 is an enlarged bottom plan view of the storage tote of FIG. 1.

Referring now to FIGS. 1-7, as noted previously, the lid 24 may be constructed from the same, similar, or different material as base 22. The lid 24 may have a dual-wall or single-wall construction. Referring momentarily to FIG. 6, the lid 24 may include one or more receptacles 48 positioned about an upwardly-facing surface thereof. The receptacles 48 may be configured for holding a beverage container or any other such item as may be desired. In addition, the lid 24 may include one or more raised elements 50 about a perimeter thereof. The raised elements 50 may incorporate one or more receptacles 48 or be entirely devoid thereof. As illustrated, the raised elements 50 define an X-shaped recess over a surface of the top of lid 24. The X-shaped recess may be sized, shaped, and configured to retain an element therein. For example, a two-by-four or similar member or a portion thereof may be retained in one length of the X-shaped recess. For instance, a piece of wood or similar material may be supported wholly or in part within one of the legs of the X-shaped recess defined by the raised elements 50 such that a user of the storage tote 20 may perform any manner of activities on the material. For example, the user may use the X-shaped recess to support a portion of a piece of wood so that a second portion extending beyond the lid 24 may be cut or be modified in some other such conventional manner. In this way, the storage tote 20 not only serves as a device for carrying items but also as a work surface such that the storage tote 20 may serve to carry out any number of additional functions desired by the user. Moreover, the user may utilize the storage tote 20 in either a lowered or a raised position depending on the orientation of the support assembly 26 as will be discussed further herein. Understandably, raised elements 50 may be arranged in any number of alternative manners to thereby define any number of alternative recess shapes for securing alternative elements therein as may be desired.

Referring again to FIGS. 1-7, the support assembly 26 includes a first pair of legs 52 secured to base 22 generally adjacent to first end wall 32. A second pair of legs 54 is similarly secured to base 22 generally adjacent to second end wall 34. The first pair of legs 52 and second pair of legs 54 may be constructed from a plastic or similarly durable, lightweight material. In particular, the first pair of legs 52 and second pair of legs 54 may be constructed from a material sufficiently durable to support the weight of the storage tote 20 and the contents thereof. As will be discussed in detail herein, the first pair of legs 52 and the second pair of legs 54 are selectively rotatable or otherwise movable between a folded position as shown in FIGS. 1-7 and a deployed position as shown in FIGS. 8-14. When first pair of legs 52 and second pair of legs 54 are in their folded position, the first pair of legs 52 and second pair of legs 54 are configured to support the storage tote 20 in a first, lowered orientation. In this orientation, the storage tote 20 is supported at or near the support surface upon which it rests on at least a portion of the lengths of the support assembly 26; however, when the first pair of legs 52 and second pair of legs 54 are in their deployed position, the base 22 of storage tote 20 is elevated above the support surface and supported on at least portions of the ends of the first pair of legs 52 and the second pair of legs 54 in a raised or elevated position. Thus, when the first pair of legs 52 and second pair of legs 54 are in their deployed positions, the storage tote 20 is generally elevated to make it easier for a user thereof to access the contents thereof as desired.

When the first and second pairs of legs 52, 54 are in their folded positions, the legs are maintained in the folded position by the weight of the storage tote 20 when the storage tote 20 is resting on the support surface. When the storage tote 20 is transported from place to place, the first and second pairs of legs 52, 54 are maintained in their folded positions by way of a pair of leg retention assemblies 82, which will be described in further detail herein (see FIGS. 16-17) or similar feature configured to engage the legs of the first and second pair of legs 52, 54, to prevent accidental or otherwise unwanted rotation of the legs during transport of the storage tote 20.

Referring again to FIGS. 8-14, when the first and second pairs of legs 52, 54 are in their deployed positions, the legs 52, 54 thereof are oriented at an oblique angle with respect to a lower edge of bottom wall 36 of storage tote 20. In particular, the legs 52, 54 extend downwardly and outwardly from base 22 so as to be oriented an angle greater than 90 degrees. In this manner, the legs 52, 54 are maintained in the deployed position by the weight of storage tote 20 bearing down thereupon. Alternatively, or in addition thereto, legs 52, 54 may further include an additional securing mechanism (not shown) configured to maintain the legs in their deployed position to prevent accidental or unwanted folding thereof.

One or both of the first and second pairs of legs 52, 54 may include one or more wheels 56 coupled to each of the respective legs. As illustrated, a single wheel 56 is coupled to each of the legs of the first pair of legs 52. In this manner, the storage tote 20 may be rolled across the ground or support surface on wheels 56. This is accomplished by lifting the second end wall 34 via handle 40 or recess 38 such that the second end wall 34 is lifted above the level of the first end wall 32 and so that the storage tote 20 is at least partially supported on wheels 56. Thus, a user of the storage tote 20 may move the storage tote 20 by pulling the storage tote via the handle 40 or recess 38 so that the storage tote 20 rides along the support surface on wheels 56. When the first pair of legs 52 is in their folded orientation, the base 22 may be supported by the wheels 56 on the support surface as is generally understood in the art. The second pair of legs 54, as illustrated, does not include any wheels, but it is understood that the legs 54 may include wheels or similar structures in keeping with the spirit of the present invention. Each of the second pair of legs 54 may include, for example, a flanged portion 55 disposed along a portion of a length of each of the legs 54. The flanged portion 55 extends away from each of the second pair of legs 54 so that when the legs are in the folded position, the flanged portions 55 engage the support surface for supporting the base 22 of the storage tote 20. In this manner, the flanged portions 55 and the wheels 56 cooperate to provide a substantially stable support for the storage tote 20 when the support assembly 26 is in the folded orientation. Moreover, the flanged portions 55 and the wheels 56 serve to provide a substantially level storage tote 20 to prevent items stored in or on the storage tote 20 from unwanted sliding or other such movement as is generally understood.

Figure 15:
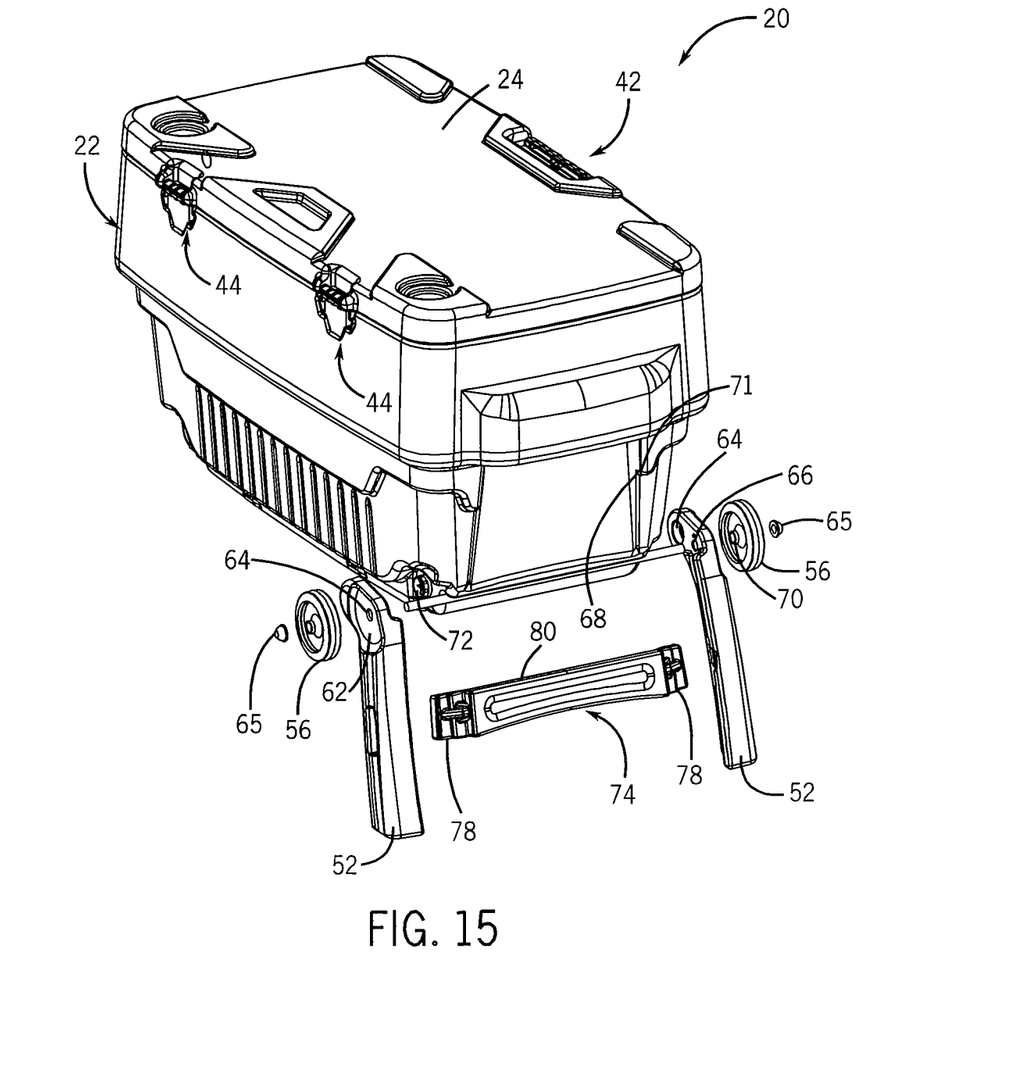
FIG. 15 is a partial exploded view of the support assembly of the storage tote according to the present invention showing a portion of a support assembly of the storage tote exploded from a base thereof.

Referring now to FIG. 15, the construction of the first pair of legs 52 is illustrated in further detail. It is understood, however, that the construction of the first pair of legs 52 is equally applicable to the construction of the second pair of legs 54. Of course, it is also understood that the construction of one or both of the first pair of legs 52 and 54 may be entirely devoid of wheels 56 or that both of the first and second pair of legs 52, 54 may include wheels 56. In addition, the construction of the legs 52 shown in FIG. 15 is merely exemplary, and it is understood that other constructions are contemplated and within the scope of the present invention.

The legs 52 have a generally elongate construction having a first end 58 coupled to the base 22 and a second end 60 opposite the first end 58. First end 58 includes a flanged portion 62 including a centrally located aperture 64 and an offset aperture 66 and defining a recess for receiving the wheels 56. A lower edge of front wall 28 of base 22 includes a corresponding recess configured to receive flanged portion 62 in close proximity therewith. At least a portion of the second end 60 of the first pair of legs 52 is configured to support the storage tote 20 when the legs 52, 54 are in the deployed position. The legs 52 may have a generally L-shaped transverse cross-section for increasing the surface area upon which storage tote 20 rests when the legs 52, 54 are in the deployed position. Other, similar such cross-sectional constructions are contemplated and within the scope of the present invention. In any event, the legs 52 are generally constructed so as to be suitable for supporting not only the weight of the base 22 and the lid 24 of the storage tote 20 but also the items intended to be stored within the base 22 or on the lid 24 of the storage tote 20.

A centrally located aperture 64 is configured to receive the end of an axle 68 that extends along a length of first end wall 32. In particular, the axle 68 is received within a recess 71 provided in a lower edge of the first end wall 32 so that the ends of axle 68 extend a predetermined distance outwardly from the front and rear edges of front wall 28 and back wall 30, respectively. The ends of axle 68 extend through centrally located aperture 64 such that wheels 56 are received over the ends thereof and rotatable therearound. The wheels 56 may be secured to axle 68 by way of a fastener or other such known means as is generally understood in the art. As previously indicated, the wheels 56 are configured to be positioned within a recess defined by the flanged portion 62 of the first end of legs 52. In this manner, wheels 56 are freely rotatable within the recess for movement of the storage tote 20. Understandably, the axle 68 may be provided on both the first and second pairs of legs 52, 54 regardless of whether the legs 52, 54 support wheels 56 thereon. In this manner, axle 68 serves to provide additional structural support for legs 52, 54.

The offset aperture 66 is configured to receive a tubular pivot element 70. The tubular pivot element 70 may be constructed from a metal, plastic or other suitable material for supporting rotation of the legs 52. The base 22 includes a corresponding hole 72 configured to receive the other end of the tubular pivot element 70. In this manner, the legs 52 are pivotally coupled to the base 22 for rotation between the deployed and folded positions. The tubular pivot element 70 may include one or more projections (not shown) or another similar such feature over an external surface thereof. The projections of the tubular pivot element 70 are configured to engage a portion of the corresponding leg 52 to thereby define a ratcheting mechanism by which the legs 52, 54 may be rotated between the deployed and folded positions. The wheels 56 may include a cap 65 received over an end of the axle 68 and configured to secure the axle to the wheels 56.

The legs 52 may be coupled to one another by a connector 74. In this manner, legs 52 may be simultaneously rotated to ensure that the legs 52 are rotated to the same position when in operation. The connector 74 may be constructed out of the same or similar material as the legs 52 and may be coupled thereto after the molding thereof. As such, connector 74 may be constructed during a separate molding operation. Alternatively, the connector 74 may be integrally formed with the legs 52. The legs 52 may include a recess or aperture 76 for receiving one of the ends 78 of connector 74. Aperture 76 may have a generally rectangular shape to correspond to the shape of ends 78. Of course, ends 78 and aperture 76 may comprise any shape desired. The connector 74 includes a generally elongate body 80 integrally formed with the ends 78. The body 80 is configured to provide structural stability to the connector 74 for supporting the legs 52 during operation. The ends 78 may have a generally flanged construction with respect to body 80 or may be otherwise offset with respect thereto.

Figure 8:
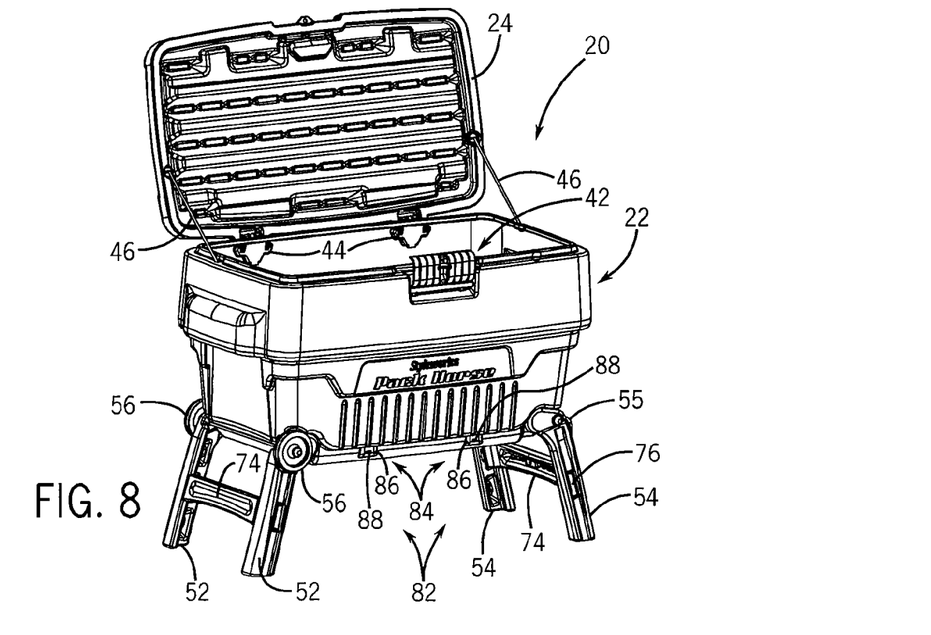
FIG. 8 is an isometric view of the storage tote of FIG. 1 in which the legs of the support assembly are arranged in a deployed orientation and the lid is in an open orientation.
Figure 9:
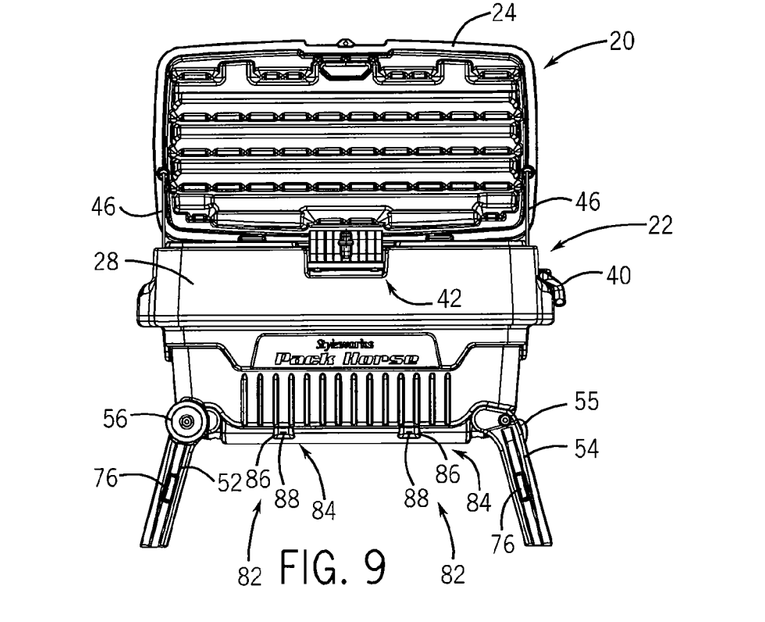
FIG. 9 is a front elevation view of the storage tote of FIG. 8.
Figure 10:
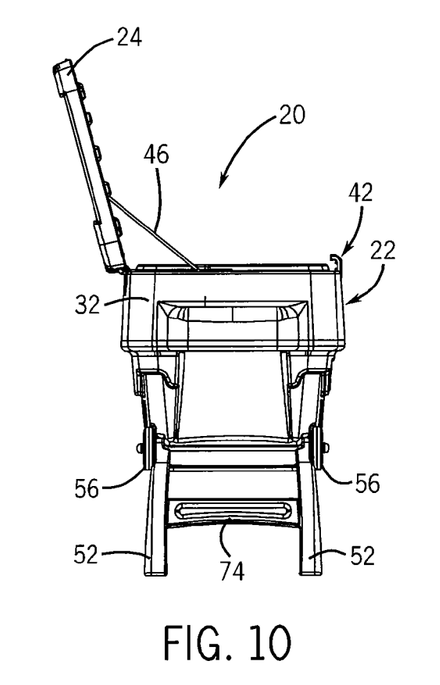
FIG. 10 is an end elevation view of the storage tote of FIG. 8.
Figure 11:
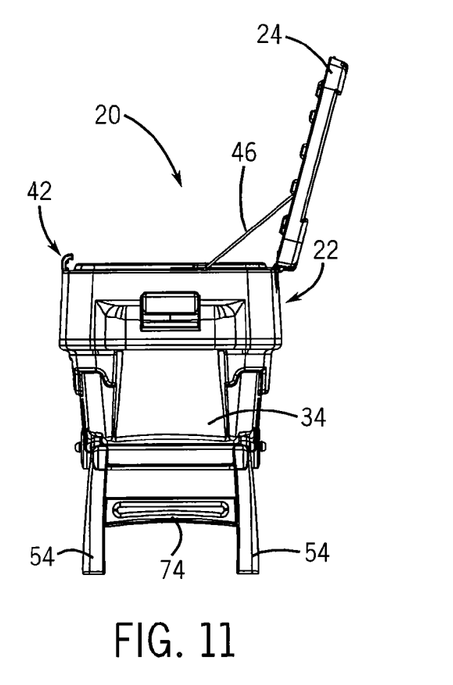
FIG. 11 is an opposite end elevation view of the storage tote of FIG. 10.
Figure 12:
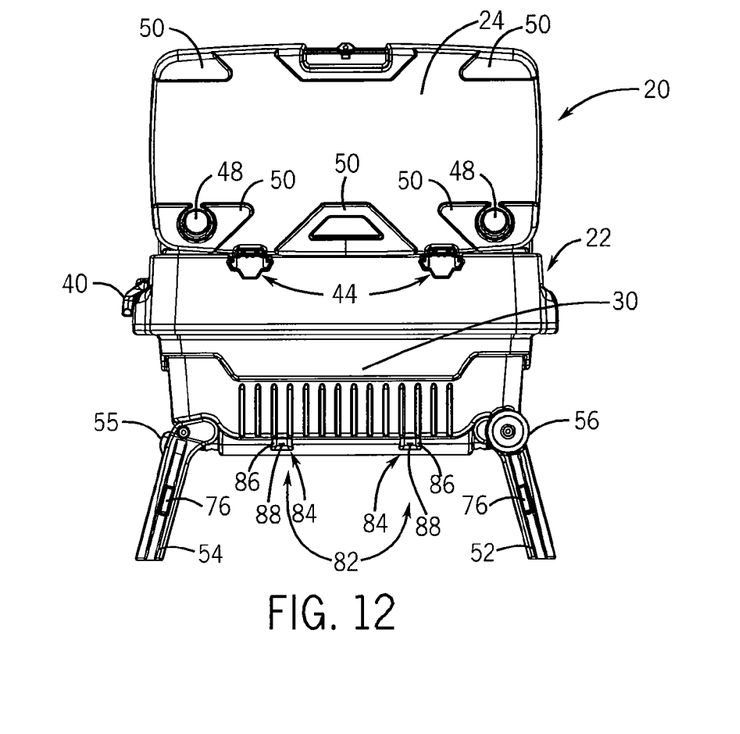
FIG. 12 is a rear elevation view of the storage tote of FIG. 8.
Figure 13:
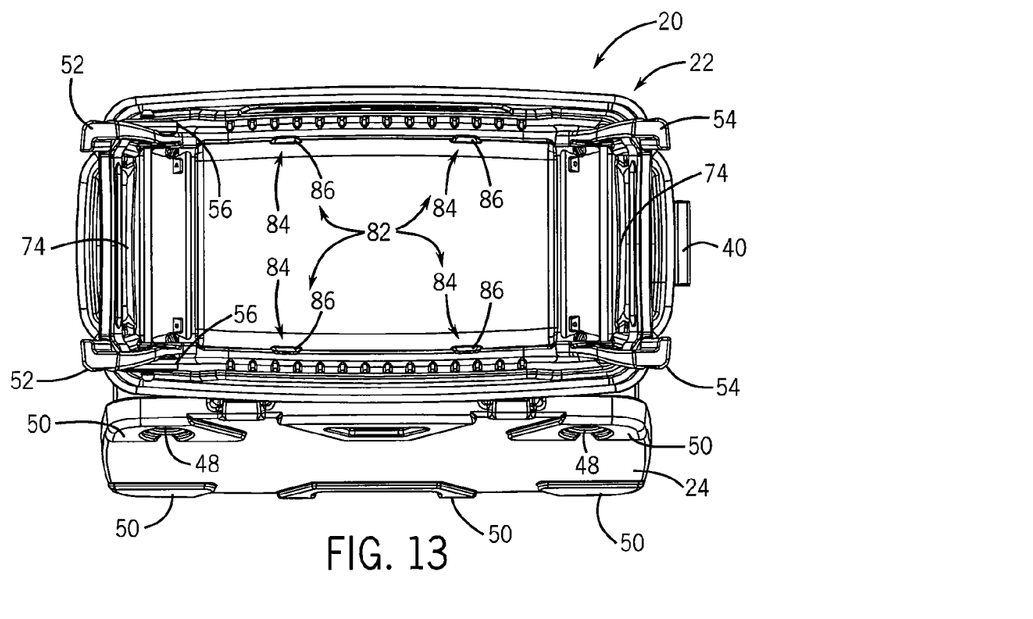
FIG. 13 is a bottom plan view of the storage tote of FIG. 8.
Figure 16:
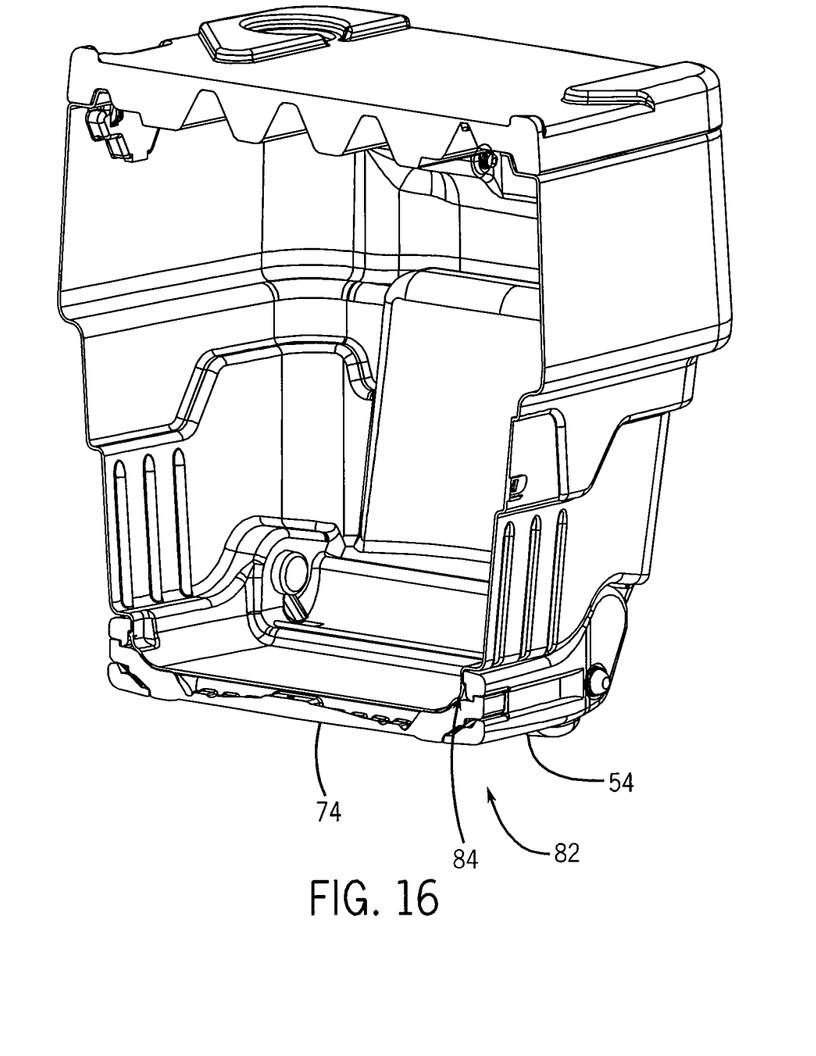
FIG. 16 is an isometric cross-sectional view of the support assembly showing a support assembly retention assembly.

With reference to FIGS. 8, 9, 12, and now with additional reference to FIGS. 16 and 17, a preferred, but exemplary, pair of leg retention assemblies 82 is shown in further detail in which each of the pair of leg retention assemblies is substantially similarly constructed such that reference to one is equally applicable to the other of the pair of leg retention assemblies. In particular, the leg retention assembly 82, as shown, includes a catch 84 on each of the front wall 28 and back walls 30 in the form of a groove, recess, or similar such void defined by a respective catch flange 86 that is configured to receive at least a portion of the respective connector 74 of the respective leg pairs 52, 54. The catch flange 86 may be in the form of a rounded projection or similar element integrally or otherwise formed with the respective wall 28, 30 of the base 22 that extends away from the respective wall 28, 30. The catch flange 86 may additionally include a lateral projection 88 integrally or otherwise formed with the catch flange 86 and which is configured to engagingly receive at least a portion of each of the respective legs of the first and second leg pairs 52, 54. In particular, each of the leg pairs 52, 54 may include a corresponding leg-securing element 90 that extends toward the base 22 when the legs are in their deployed position, which is configured to provide an engagement surface with the lateral projection 88 such that when the legs are rotated into the folded orientation from the deployed orientation, the legs are urged upwardly relative to the support surface over the lateral projection 88 to thereby engage each respective leg with the respective lateral projection and thereby secure the leg within the catch 84. The catch 84 serves to prevent accidental or otherwise unwanted movement of the legs relative to the base 22 while the legs are in the folded orientation. That is, the catch 84 of the leg retention assembly is configured to prevent the legs from rotating out of the deployed position. When the user of the storage tote 20 desires to move the legs to their deployed position, the user may apply a downward force relative to the support surface to urge the portion of the legs 52, 54 engaged with the catch 84 so that the legs are released therefrom. In this manner, the legs 52, 54 may then be freely rotated to their deployed position. Understandably, alternative constructions of the leg retention assemblies 82 are envisioned and may comprise any number of suitable alternatives.

Figure 18:
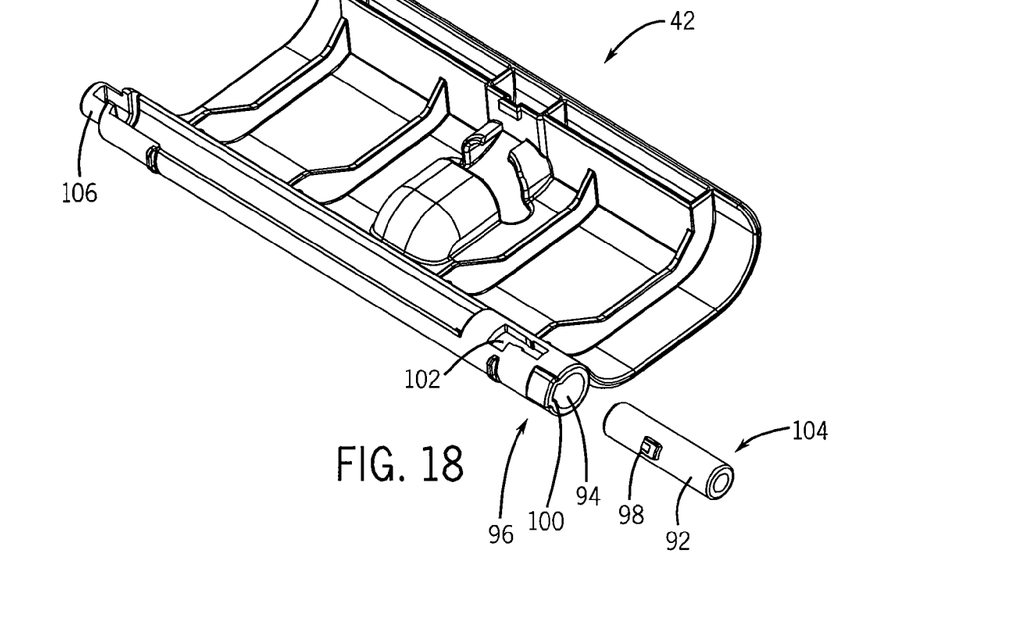
FIG. 18 is a partially exploded view of a latch assembly of the storage tote of the present invention showing the installation of a sliding pin on the latch assembly.
Figure 19:
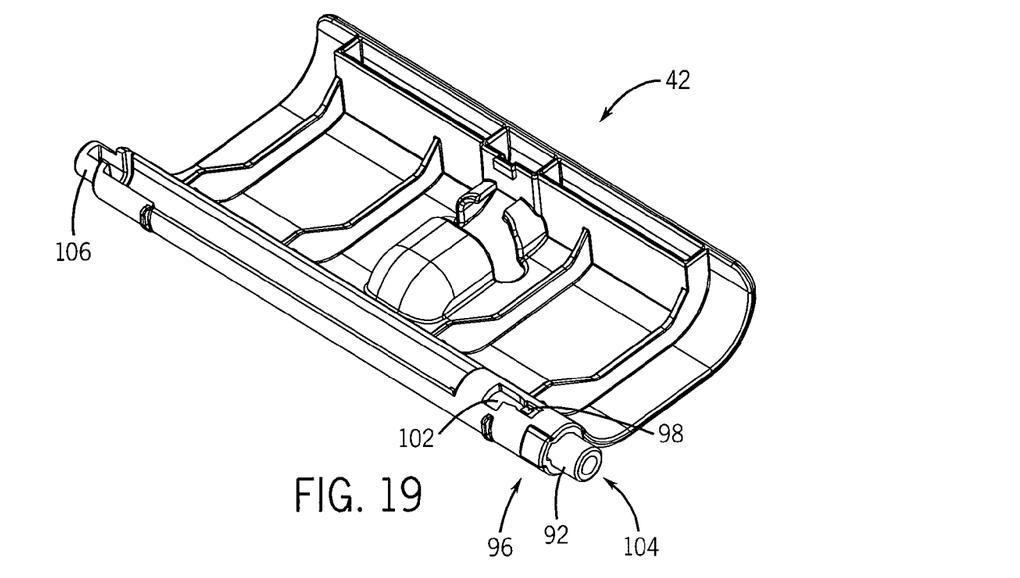
FIG. 19 is a partial view of the latch assembly of FIG. 18 in which the sliding pin is installed on the latch assembly.

Referring now to FIGS. 18-19, one embodiment of the storage tote 20 according to the invention includes an alternative construction of the latch assembly 42. The latch assembly 42 of the present embodiment includes a pin 92 received within a recess 94 formed in a lower edge 96 of the latch assembly 42. The pin 92 is secured within the recess 94 and configured to be slidable within the recess during the installation process of the latch assembly 42. The pin 92 may be cylindrically shaped or some other shape to enable the pin 92 to be slidable within the recess 94, and the recess 94 is preferably complementarily constructed so as to securely receive the pin 92. The pin 92 includes a flange 98 on a surface thereof. The flange 98 is configured to be aligned with a corresponding notch 100 or similar feature formed on the latch assembly 42 so that the pin 92 may be slidably inserted into the recess 94. The notch 100 is formed at a lateral end of the latch assembly 42 defining the recess 94 and extends within the recess 94 so as to guide movement of the pin 92 relative thereto.

Once the pin 92 is installed in the recess 94, it is slid until it reaches a terminal portion of the recess 94 at which point the pin 92 is rotated so that the flange is aligned with a window 102 disposed in the latch assembly 42. The window is sized and shaped to receive the flange 98 therein such that the pin 92 may not be removed from the recess 94 once rotated. In this manner, the pin 92 is secured within the recess 94. If desired, an operator may remove the pin 92 by rotating the pin 92 so that the flange is aligned with the notch 100 so that the pin 92 may be slid within the recess 94 and out thereof.

The pin 92 is configured to be received within a recess, aperture, or similar such feature (not shown) of the base 22. The pin 92 may be configured so that it may be urged inwardly relative to the latch assembly to enable the pin 92 to more easily fit within the area of the base 22 to which the latch assembly 42 is to be installed. Once the pin 92 is aligned with the recess or aperture of the base 22, the operator may simply release the pin such that it is urged forwardly and out of the end of the latch assembly 42 so that it may be received within the aperture or recess of the base 22 and secure the latch assembly 42 thereto. Understandably, the pin 92 is configured such that an end portion 104 projects outboard relative to the latch assembly 42 so that the pin 92 may engage the recess or aperture of the base 22 to enable coupling of the latch assembly 42 to the base 22. In this manner, the latch assembly 42 of the present embodiment enables the latch assembly 42 to be installed on the base 22 without the use of tools, secondary equipment or additional fasteners.

In one construction of the present embodiment, the latch assembly 42 includes the pin 92 on only one end thereof while the opposing end of the latch assembly 42 includes a standard pin, flange or similar such element configured to be received within a corresponding aperture or recess on the base 22. Of course, in another construction of the present embodiment, the latch assembly 42 may include the pins 92 at both ends of the latch assembly 42. As illustrated, the latch assembly 42 includes an integrally formed projection 106 on the opposing end of the latch assembly 42 relative to the pin 92. As is generally understood, the projection 106 is configured for being received within an aperture or recess (not shown) on the base 22 for securing the latch assembly 42 to the base 22. In operation, the projection 106 may be initially inserted into its respective recess or aperture to secure the opposing end to the base. Once the projection 106 is secured to the base 22, the pin 92 may be inserted into its respective aperture or recess. As the pin 92 is capable of movement within the recess 94, the pin 92 may be moved inward relative to the latch assembly 42 to ensure that the latch assembly is able to clear the surrounding area of the base 22 for insertion of the pin 92 into the base 22. Once the pin 92 clears the surrounding area of the base 22 and is aligned with the respective aperture or recess, the pin 92 may be released so that it is biased toward the aperture or recess for insertion therein. Accordingly, the latch assembly 42 according to the present construction is able to be secured to the base 22 in a relatively close-fit manner without the use of additional tools or the like.

In one preferred embodiment, the deployed legs 52, 54 can support at least 200 pounds. Various alternatives are contemplated as being within the scope of the following claims particularly pointing out and distinctly claiming the subject matter regarded as the invention.

We claim:

1. A storage tote comprising:
 a base including a front wall, a back wall opposite the front wall, a first end wall, a second end wall opposite the first end wall, the first end wall and the second end wall generally transversely oriented with respect to the front wall and the back wall, and a bottom wall opposite a generally open top configured to enable introduction of items to be stored in the storage tote, wherein the front wall, the back wall, the first end wall, the second end wall and the bottom wall define an interior space for storing the items;
 a lid movably coupled to the base between a closed position in which the lid is positioned over the open top of the base to prevent access to the interior space and an open position in which the interior space is accessible;
 a support assembly configured for supporting the base on a support surface having a first end portion coupled to the base, a second end portion opposite the first end, and an intermediate portion disposed between the first end and the second end, wherein the support assembly is movable between a folded orientation in which the support assembly is generally parallel with the support surface so as to be at least partially supported on the intermediate portion at a first height and a deployed orientation in which at least one of the first and second end portions supports the base above the support surface at a second height that is greater than the first height;
 a retention assembly configured to be engaged by a portion of the support assembly when the support assembly is in the folded orientation to secure the support assembly in the folded orientation; and wherein
 the retention assembly comprises at least one catch flange extending outwardly in a lateral direction from both the front and back walls of the base and wherein each of the respective catch flanges is configured to engage the support assembly.

2. The storage tote of claim 1, wherein the support assembly comprises at least one pair of legs coupled to the base.

3. The storage tote of claim 1, wherein the support assembly comprises a first pair of legs coupled to the base adjacent the first end wall and a second pair of legs coupled to the base adjacent the second end wall.

4. The storage tote of claim 3, wherein at least one of the first pair of legs and the second pair of legs comprises wheels rotatably supported thereto for facilitating movement of the storage tote across the support surface.

5. The storage tote of claim 3, wherein each of the at least one of the first pair of legs and the second pair of legs is coupled to one another by a connector.

6. The storage tote of claim 1, wherein the support assembly comprises at least a first leg and a second leg coupled to one another by a connector.

7. The storage tote of claim 1, wherein the first end includes a pivot coupled between the support assembly and the base configured to enable the support assembly to pivot relative to the base between the folded orientation and the deployed orientation.

8. The storage tote of claim 1, wherein the support assembly comprises:
   a first pair of legs coupled to the base adjacent to the first end wall,
   a second pair of legs coupled to the base adjacent to the second end wall, and
   a pair of wheels coupled to one of the first pair of legs and the second pair of legs at the first end portion thereof and configured to engage the support surface for selective rotative movement relative thereto when the support assembly is in the folded orientation.

9. The storage tote of claim 8, wherein the other of the first pair of legs and the second pair of legs include a flange configured to engage the support surface when the support assembly is in the folded orientation.

10. A method of making a storage tote comprising the steps of:
   forming a base having a front wall, a back wall opposite the front wall, a first end wall, a second end wall opposite the first end wall and generally transverse to the front wall and the back wall, and a bottom wall interconnected with the front wall, back wall, first end wall and second end wall and opposite an open top through which items to be stored in the storage tote may be introduced;
   forming a lid configured to be selectively received over the open top of the base;
   coupling the lid to the base about a hinge assembly about which the lid may be selectively rotated between a closed position in which the lid is generally parallel with the open top and an open position in which the lid is generally orthogonally oriented with respect to the open top;
   securing a support assembly to the base configured to support the base on a support surface and wherein the support assembly is configured for rotation with respect to the base between a folded position in which the bottom wall is at least partially supported a length of the support assembly and wherein the support assembly is arranged substantially parallel with the support surface and a deployed position in which the support assembly is arranged in a generally longitudinally extending orientation for supporting the storage base above the support surface;
   disposing a retention assembly with at least one catch flange extending outwardly in a lateral direction from both the from and back walls of the base; and wherein the retention assembly is configured to be engaged by a portion of the support assembly when the support assembly is in the folded orientation to secure the support assembly in the folded position.

11. The method of claim 10, wherein the support assembly comprises a first pair of legs coupled to the base adjacent the first end wall and a second pair of legs coupled to the base adjacent to the second end wall.

12. The method of claim 11, further comprising the steps of coupling the first pair of legs to the base about a pair of corresponding pivot elements for rotation of the first pair of legs and coupling the second pair of legs to the base about a pair of corresponding pivot elements for rotation of the second pair of legs.

13. The method of claim 12, further comprising the steps of securing the legs of the first pair of legs to one another and securing the legs of the second pair of legs to one another for simultaneous rotation of the legs of the first pair of legs with one another and the legs of the second pair of legs with one another.

14. The method of claim 13, further comprising the step of coupling at least one wheel to each of the legs of one of the first pair of legs and the second pair of legs, and wherein the legs of the first pair of legs and the legs of the second pair of legs are secured to one another by a connector extending parallel with respect to the first end wall and the second end wall.

15. A support assembly for a storage tote comprising a base including a front wall, a back wall opposite the front wall, a first end wall, a second end wall opposite the first end wall and generally transverse to the front wall and back wall, and a bottom wall opposite an open top and a lid hingedly coupled to the base to selectively cover the open top, the support assembly comprising:
   at least a first pair of legs adjacent to the first end wall; and
   a second pair of legs adjacent to the second end wall, wherein each of the first pair of legs and the second pair of legs includes a first end portion coupled to the base, a second end portion opposite the first end, and an intermediate portion therebetween;
   wherein the first pair of legs and the second pair of legs are independently movable relative to the other between a folded position in which the legs extend generally parallel to a support surface;
   wherein the bottom wall is at least partially supported on the intermediate portions and a deployed position in which the legs are at least partially supported on the respective second end portions;
   wherein the first pair of legs and second pair of legs are configured to be selectively latchable in the folded position relative to the base by a retention assembly;
   a first connector extending between the legs of the first pair of legs and a second connector extending between the second pair of legs;
   wherein the retention assembly comprises at least one catch on a front wall and at least one catch on the back wall configured to receive a portion of the at least one of the first connector and the second connector.

16. The support assembly of claim 15, wherein the legs of the first pair of legs are coupled to one another so as to rotate simultaneously with one another and the legs of the second pair of legs are coupled to one another so as to rotate simultaneously with one another.

17. The support assembly of claim 16, further comprising a first connector extending between the legs of the first pair of legs and a second connector extending between the second pair of legs.

18. The support assembly of claim 15, further comprising at least one wheel coupled to each of the legs of one of the first pair of legs and the second pair of legs.

19. The storage assembly of claim 15, wherein the retention assembly comprises at least one catch flange extending outwardly in a lateral direction from both the front and back walls of the base and wherein each of the respective catch flanges is configured to engage the support assembly.

\* \* \* \* \*